United States Patent [19]

Torii et al.

[11] Patent Number: 5,008,832
[45] Date of Patent: Apr. 16, 1991

[54] INDUSTRIAL ROBOT ABLE TO SET MOTION CONDITIONS DEPENDING ON POSTURE OF INSTALLATION THEREOF

[75] Inventors: Nobutoshi Torii, Hachioji; Hitoshi Mizuno; Katsuyuki Muraki, both of Yamanashi, all of Japan

[73] Assignee: Fanuc Ltd., Yamanashi, Japan

[21] Appl. No.: 415,209

[22] PCT Filed: Jan. 9, 1989

[86] PCT No.: PCT/JP89/00016

§ 371 Date: Sep. 5, 1989

§ 102(e) Date: Sep. 5, 1989

[87] PCT Pub. No.: WO89/06180

PCT Pub. Date: Jul. 13, 1989

[30] Foreign Application Priority Data

Jan. 9, 1988 [JP] Japan ............................. 63-1810

[51] Int. Cl.⁵ ................... G05B 19/18; B25J 9/16; B25J 13/00
[52] U.S. Cl. ................... 364/513; 364/154; 318/566; 318/626; 901/2; 901/49
[58] Field of Search ................... 364/513, 153, 154; 318/566, 626; 901/49, 50

[56] References Cited

U.S. PATENT DOCUMENTS

| | | | |
|---|---|---|---|
| 4,229,136 | 10/1980 | Panissidi | 414/673 |
| 4,305,028 | 12/1981 | Kostas | 318/565 |
| 4,348,623 | 9/1982 | Kobayashi | 318/568 |
| 4,362,978 | 12/1982 | Pollard | 318/568 |
| 4,396,987 | 8/1983 | Inaba | 364/513 |
| 4,482,968 | 11/1984 | Inaba | 364/513 |

FOREIGN PATENT DOCUMENTS 60-44293 3/1985 Japan.
61-114308 6/1986 Japan.
61-231604 10/1986 Japan.
63-193203 8/1988 Japan.

*Primary Examiner*—Michael R. Fleming
*Assistant Examiner*—Roger S. Joyner
*Attorney, Agent, or Firm*—Armstrong, Nikaido, Marmelstein, Kubovcik & Murray

[57] ABSTRACT

An industrial robot is able to automatically set the operating conditions thereof depending on a position of installation. The motion of a robot unit is input and controlled by a robot control unit. A first data storage portion of the robot control unit is provided with a storage region preliminarily storing (a) data about installation positions of the robot unit with respect to a reference installation position of the same robot unit, and (b) date about operating conditions with respect to the positions of installation. When data about an installation position upon the use of the robot is input to the robot control unit, the data of the operating conditions, in response to the input data of the position of installation, is read from the first data storage unit, and is automatically set in a second data storage unit to control the motion of the robot unit in accordance with the operating conditions set in the second data storage unit.

12 Claims, 2 Drawing Sheets

Fig.2

| ANGLE OF POSITION OF INSTALLATION (deg) | 0 | 5 | 10 | 15 | 20 | 25 | 30 | 35 |
|---|---|---|---|---|---|---|---|---|
| STROKE (deg) | ±150 | ±150 | ±150 | ±150 | ±150 | ±150 | ±150 | ±150 |
| MAXIMUM OPERATING SPEED (deg/s) | 135 | 135 | 120 | 115 | 110 | 100 | 95 | 85 |
| ANGLE OF POSITION OF INSTALLATION (deg) | 40 | 45 | 50 | 55 | 60 | 65 | 70 | 75 |
| STROKE (deg) | ±150 | ±150 | ±60 | ±60 | ±60 | ±45 | ±45 | ±45 |
| MAXIMUM OPERATING SPEED (deg/s) | 80 | 75 | 80 | 75 | 70 | 80 | 80 | 75 |
| ANGLE OF POSITION OF INSTALLATION (deg) | 80 | 85 | 90 | 95 | 100 | 105 | 110 | 115 |
| STROKE (deg) | ±45 | ±45 | ±45 | ±45 | ±45 | ±45 | ±45 | ±45 |
| MAXIMUM OPERATING SPEED (deg/s) | 75 | 75 | 75 | 75 | 75 | 75 | 80 | 80 |
| ANGLE OF POSITION OF INSTALLATION (deg) | 120 | 125 | 130 | 135 | 140 | 145 | 150 | 155 |
| STROKE (deg) | ±60 | ±60 | ±60 | ±150 | ±150 | ±150 | ±150 | ±150 |
| MAXIMUM OPERATING SPEED (deg/s) | 70 | 75 | 80 | 75 | 80 | 85 | 95 | 100 |
| ANGLE OF POSITION OF INSTALLATION (deg) | 160 | 165 | 170 | 175 | 180 | | | |
| STROKE (deg) | ±150 | ±150 | ±150 | ±150 | ±150 | | | |
| MAXIMUM OPERATING SPEED (deg/s) | 105 | 115 | 120 | 130 | 135 | | | |

INDUSTRIAL ROBOT ABLE TO SET MOTION CONDITIONS DEPENDING ON POSTURE OF INSTALLATION THEREOF

TECHNICAL FIELD

The present invention relates to an improvement in the function of an industrial robot constituted by a robot control unit and a robot unit as a machine. More particularly, it relates to an improvement in a multi-articulated industrial robot provided with a construction such that a plurality of robotic arms of the robot unit are connected to one another by an articulation. The arms are used at various positions e.g., a position where the robot unit is installed on a horizontal floor, a position, where the robot unit is installed on the surface of a wall, a position where the robot unit is suspended from a ceiling, and a position where at the robot unit is installed on an inclined plane, while automatically changing the operating conditions thereof to be set in the robot control unit. The control unit is provided with inputs, including information of an actual posture at that time, which differ in accordance with load conditions applied to the robotic arms moving about respective articulatory axes of the robot unit, which in turn differ in response to a change in the position of installation of the multi-articulated robot unit.

BACKGROUND ART

Industrial robots, especially multi-articulated industrial robots are installed at various positions depending on environmental conditions at a site where the industrial robots are used. For example, when a multi-articulated industrial robot is used for a welding operation and various sealing operations, the robot is often installed on the surface of a wall or a ceiling of a building instead of a ground floor, to be able to assume a posture suitable for these operations. When these positions of installation of robot units are taken with a multi-articulated industrial robot having a plurality of articulated robotic arms, load conditions due to gravitational forces applied to respective arms mounted on respective articulatory axes and a rotary columnar body of the multi-articulated industrial robot during movement of these movable elements of the industrial robot differ in accordance with the installed position. Namely, when the robot unit is disposed so that the robot is installed on a horizontal plane, the rotary columnar body of the robot unit rotatable about a vertical axis is not subjected to a load due to the force of gravity applied to the body. Nevertheless, when the robot unit is disposed on a vertical surface of a wall, the axis about which the columnar body thereof is rotated horizontally is extended, and therefore, during the rotating motion of the columnar body of the robot, the body must be subjected to a large change in a load depending on the position to which the columnar body per se is rotated about the rotating axis thereof, as well as the position to which the robotic arm pivotally attached to a foremost end of the columnar body is brought. As a result, sometimes the robot columnar body is subjected to an extraordinary load, and accordingly, an electric motor used as a rotatory drive source for the columnar body is subjected to an excessive load. Therefore, in the case of conventional industrial robots, when the robots are to be used at various positions, a table showing the correspondence between different sited positions and the related operating conditions about respective articulatory axes is prepared beforehand during the manufacture of the industrial robots, and the prepared table is inserted in the instructions for operating the industrial robots. Thus, users of the industrial robots are able to refer to the table when installing each robot unit at a site, and to subsequently set the operating conditions of respective movable elements of the robot in the robot control unit depending on the position of installation of the robot unit.

However, when the above-mentioned method of setting the operating conditions is taken, the user of each industrial robot must determine the position of installation of the robot unit by measuring an angle of inclination of the robot unit with respect to a horizontal ground floor, and subsequently set the operating conditions of respective articulatory axes, such as the moving region (stroke of the robotic arms), and the maximum operating speeds corresponding to the measured angle of inclination of the robot. Namely, the user must set many operating conditions in the robot control unit before using the industrial robot, which is cumbersome for the user and often causes a setting of erroneous operating conditions in the robot control unit because of a misreading of the table by the user. As a result, the industrial robot cannot be properly controlled and is not stably operated.

DISCLOSURE OF THE INVENTION

Therefore, an object of the present invention is to provide an improvement in an industrial robot capable of obviating problems encountered by the conventional industrial robot whereby when a datum of a position of installing of a robot is input to a robot control unit, operating conditions of respective robotic movable elements of the robot are automatically established by the robot control unit.

Another object of the present invention is to provide an multi-articulated industrial robot able to automatically set the operating conditions depending on the position at which the robot is installed for use at a site.

In accordance with the present invention, there is provided an industrial robot able to automatically set operating conditions depending on a position at which the industrial robot is installed, which includes a robot unit provided with at least movable elements and a base element to be fixedly installed at a site at which the robot is to be used. A robot control unit is provided with a first data storage unit for storing basic control data for robot operations. A second data storage unit stores control data and is capable of receiving input from outside. A control function unit controls the movement of the movable elements based on the aforementioned control data. A predetermined storage region is provided in the first data storage unit for storing data about various positions of installation of the robot unit with respect to a predetermined reference position of installation of the robot, and data about operating conditions for the various positions of installation of the robot. An input unit provides the control function unit of the robot control unit with data indicating the installation position of the robot unit when the robot unit is used. A setting unit reads the operating conditions corresponding to the installation position of the robot unit provided by the input unit from the predetermined storage region of the first data storage unit and automatically sets the read operating conditions in the second data storage unit of the robot control unit. Accordingly, when a robot operator inputs the installation position of the robot unit to the robot control unit, i.e., an angle of inclination of the plane on which the robot unit is installed, the operating conditions corresponding to the, input data about the installation position of the robot unit are automatically read from the first data storage unit of the robot control unit, and are set in the second data storage unit. Thus, when the movements of the robot unit are controlled by the robot control unit, the limit of the motion stroke and the maximum operating speed of the respective movable elements of the robot unit are determined by the robot control unit.

BRIEF DESCRIPTION OF THE DRAWINGS

The above and other objects, features and advantages of the present invention will be made apparent from the ensuing description of an embodiment with reference to the accompanying drawings wherein.

BEST MODE OF CARRYING OUT THE INVENTION

Figure 1:
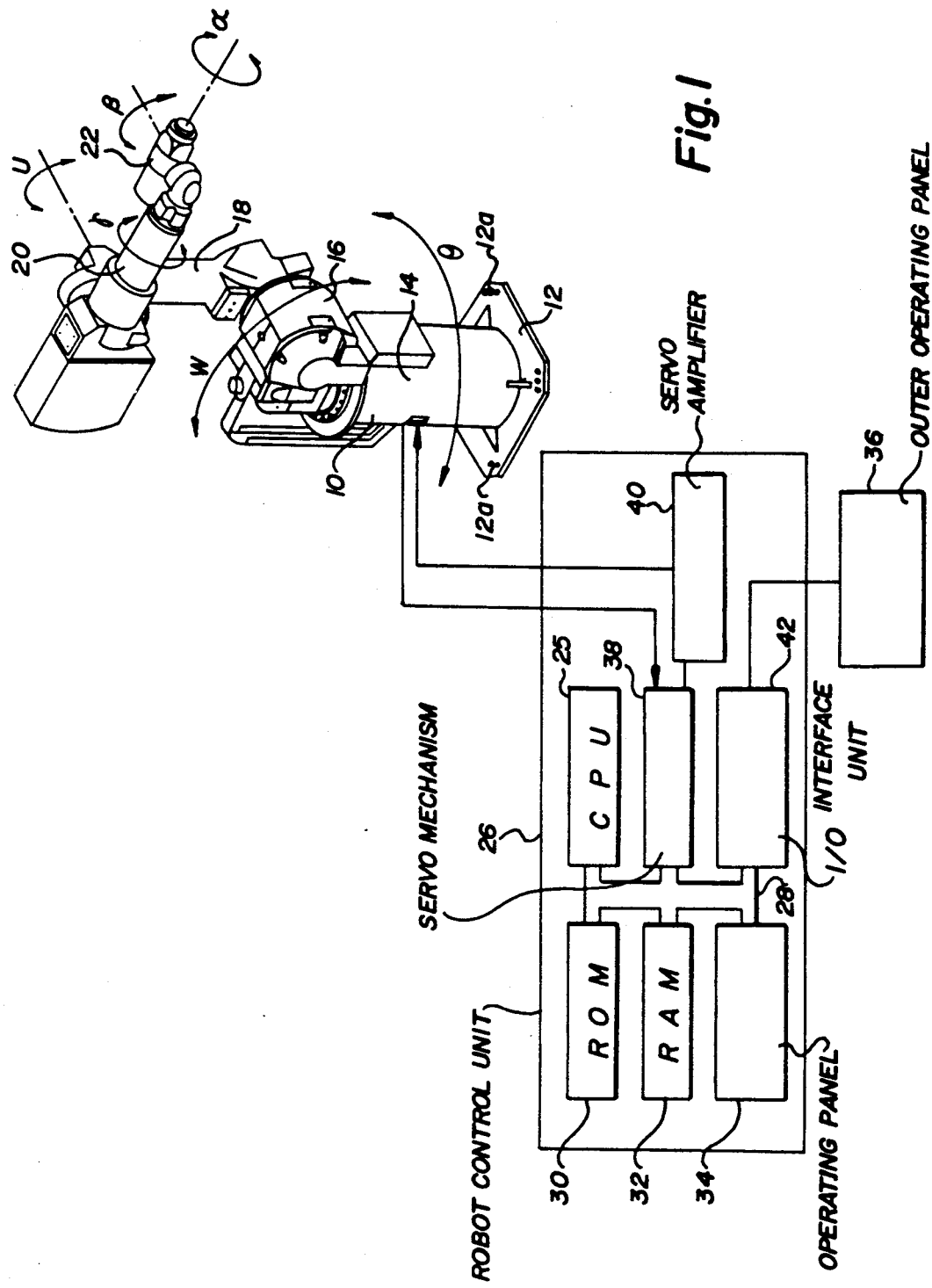
FIG. 1 is schematic and systematic view of an industrial robot able to automatically set operating conditions depending on installation positions of the robot, according to an embodiment of the present invention; and, FIG. 2 is a graph indicating the relationship between the installation positions of a robot unit and the operating conditions.

Referring to FIG. 1, a robot unit 10 of a multi-articulated industrial robot has a base element 12 to be used as a base for installing the robot unit on the surface of a floor or other sites at which the industrial robot is to be used. A lower columnar element 14 is integral with the base element 12. An upper columnar element 16 is attached to an uppermost end of the lower columnar element 14 to be rotatable about an axis ($\theta$-axis). On an upper end of the upper columnar element 16 is pivotally mounted a first robotic arm 18 turnable about an axis (W-axis) perpendicular to the above-mentioned $\theta$-axis. A second robotic arm 20 is pivotally attached to a front end of the first robotic arm 18 to be turnable about an axis (U-axis) parallel with the above-mentioned W-axis. A robotic wrist 22 is in turn attached to a front end of the second robotic arm 20. An end effector (not shown in FIG. 1) is attached to the robotic wrist 22. A robot control unit 26 which controls the motions of the respective movable elements of the robot unit 10 about the respective articulatory axes ($\theta$axis, W-axis, and U-axis) is provided, as a processing unit, with a known CPU 25 to which a ROM 30 used as a storage means for storing basic processing data for controlling the operation of the robot unit, and a RAM 32 used as another storage means for erasably storing operating conditions and data in response to various conditions of use of the robot unit when such conditions and data are input are connected via bus lines 28. Also an outer operating panel 36 for use in inputting the operating program is connected to the CPU 25 via the bus line 28 and an I/0 interface unit 42. The robot control unit 26 is also provided with servo mechanisms 38 and servo amplifiers 40 arranged respectively to be connected to actuators, e.g., electric motors, which are drive sources for the respective movable elements about the respective articulatory axes of the robot unit 10. The robot control unit 26 supplies motion commands (positional commands) with respect to the respective articulatory axes to these servo mechanisms 38 and servo amplifiers 40.

With the above-mentioned arrangement of the robot unit and the robot control unit, when the robot unit 10 is fixedly disposed at a site for use at various positions, such as a position where the robot unit 10 is installed on a wall, and a position where the robot unit 10 is installed on a ceiling, with reference to a reference plane consisting of a horizontal surface of a ground floor, through-holes 12a for screw bolts, formed in the base element 12 are used for fixing the base element 12 to the site by employing screw bolts. When the base element 12 is fixed, the robot unit 12 becomes ready for use.

The position of installation of the robot unit of an industrial robot is not often, changed, and when the industrial robot is initially brought to a site for use and installed there, the installed posture of the robot unit is generally unchanged. Therefore, the position of installation of the robot unit is definitely determined at the time the industrial robot is taken to a site for use in accordance with the operating requirements of the industrial robot, i.e., what part of a workpiece is to be welded by the industrial robot, what part of a workpiece is to be sealed by the industrial robot, or from where to where the industrial robot is to transfer a workpiece or a product.

When the position of installation of the robot unit is definitely determined, the operating conditions of the movable elements of an industrial robot, such as the upper columnar 16, the first robotic arm 18, the second robotic arm 20, and the robotic wrist, under the effect of gravity are also determined.

Therefore, in accordance with the present invention, when the robot unit 10 and the robot control unit 26 are combined together to obtain a complete industrial robot, data indicating a correspondence between the above-mentioned possible positions of installation of the robot unit and the related operating conditions (the maximum and minimum values of the motion strokes, and the maximum and minimum speed of the motion of the movable elements) are stored in an appropriate region of the ROM 30 of the robot control unit 26 in the form of a table (referred to as a data table hereinafter.). On the other hand, data about actual positions of installation of the robot unit, e.g., angular values of inclination of planes on which the robot unit is installed, with respect to a horizontal plane which is made as 0° degree angular value, can be set in an appropriate region of the RAM 32 of the robot control unit 26. Namely, an operator of the industrial robot is able to measure an actual angle of the installation position of the robot unit with respect to the horizontal reference position and to input the measured angular value into the robot control unit 26 using the operating panel 36. The input angular value is then stored in the RAM 32 as data indicating the actual installation position of the industrial robot. Accordingly, when desired motion programs are supplied from the operating panel 36 into the robot control unit 26, the CPU 25 of the robot control unit 26 reads the stored data of the actual installation position of the robot unit 10 out of the RAM 32, and reads the operating conditions of the respective articulatory axes of the robot unit corresponding to the above-mentioned position data out of the ROM 30. Subsequently, the CPU 25 checks whether or not objective position data of the desired motion programs are in the boundary of the motion (strokes) of the respective articulatory axes of the robot unit. When the objective position data are beyond the boundary, the CPU 25 generates an alarm signal to warn the operator of the industrial robot.

When the robot unit 10 is moved during input and replaying of the desired operating programs, the CPU 25 of the robot control unit 26 similarly reads the operating conditions from the ROM 30, and automatically carries out an operation to restrict the strokes and the maximum speeds of the motions of the respective articulatory axes of the robot unit within the appropriate values in response to the actual position of installation of the robot unit 10. Therefore, the motions of the moving elements of the robot unit 10 are suitably carried out in accordance with the operating conditions stored for the respective articulatory axes of the industrial robot.

FIG. 2 illustrates an example of a table of the data indicating the correspondence between the operating conditions and the position of installation of the robot unit, preliminarily stored in the ROM 30 of the robot control unit 26. In the data table of FIG. 2, the operating conditions are shown with respect to the angular values of the positions of installation of the robot unit 10 from 0° to 180°, i.e., the table of data with respect to the various installation positions from the horizontal installation position to the position where the robot unit is suspended from the ceiling; that is 180 degrees from the horizontal positions, are stored in the ROM 30.

From the foregoing description, it will be understood that, according to the present invention, when the industrial multi-articulated robot is used under different installation positions, and when a condition of the installation position of the robot unit at the site of use is established, the operating conditions of the moving elements of the robot unit are automatically set in the robot control unit. Therefore, in comparison with the prior art wherein an operator of the industrial robot must set respective operating conditions in response to a change in the position of installation of the robot unit, the operation of the industrial robot of the present invention is remarkably simplified. Also, since an erroneous setting of the operating conditions of the robot during the setting operation of the operator is avoided, the reliability of the operation of the industrial robot is increased.

Although the foregoing description of the invention is made with respect to the embodiment of a multi-striculated industrial robot, the invention per se will be similarly applicable to other types of industrial robots.

We claim:

1. An industrial robot able to automatically set operating conditions in accordance with an installation position of the industrial robot comprising:
    a robot unit provided with at least movable elements each movable element movable about an articulatory axis, and a base element to be fixedly installed at a site at which the industrial robot is to be used;
    a robot control unit provided with a first data storage unit for storing basic control data for robot operation, a second data storage unit for storing control data externally input, and a control function unit for controlling motion of said movable elements based on said control data stored in said first and second data storage units;
    a predetermined storage region provided in said first data storage unit for storing (a) data about various installation positions of said robot unit with respect to a predetermined reference installation position of said robot unit, and (b) data about operating conditions for various installation positions of said robot unit;
    an input unit for providing said control function unit of said robot control unit with data indicating an installation position of said robot unit during use of said robot unit; and
    a setting unit for reading out the operation conditions, corresponding to the data indicating the installation position of the robot unit provided by said input unit, from said predetermined storage region of said first data storage unit and for automatically setting externally input operating conditions in said second data storage unit of said robot control unit.

2. An industrial robot according to claim 1, wherein said data about various installation positions of said robot unit are data of angles of inclination with reference to a reference position consisting of a position where said robot unit is installed on a horizontal ground floor, and wherein said operating conditions are data of an extent of motions and speed of motions of each movable element of said robot unit about each articulatory axis.

3. An industrial robot according to claim 1, wherein said first data storage unit comprises a ROM and said second data storage unit comprises a RAM, respectively.

4. An industrial robot according to claim 1, wherein said input unit comprises an operating panel provided for said robot control unit.

5. An industrial robot according to claim 1, wherein said input unit comprises an operating panel externally connected to said robot control unit.

6. An industrial robot according to claim 1, wherein said movable elements of said robot unit include a plurality of articulated robotic arms.

7. An industrial robot including a robot unit provided with at least movable elements each movable element movable about an articulatory axis, and a base element to be fixedly installed at a site at which the industrial robot is to be used, and means for automatically setting operating conditions in accordance with an installation position of the industrial robot, wherein said automatic setting means comprise:
    a robot control unit provided with a first data storage unit for storing basic control data for robot operation, a second data storage unit for storing control data externally input, and a control function unit for controlling motion of said movable elements based on said control data stored in said first and second data storage units;
    a predetermined storage region provided in said first data storage unit for storing (a) data about various installation positions of said robot unit with respect to a predetermined reference installation position of said robot unit, and (b) data about operating conditions for various installation positions of said robot unit;
    an input unit for providing said control function unit of said robot control unit with data indicating an installation position of said robot unit during use of said robot unit; and
    a setting unit for reading out the operating conditions, corresponding to the data indicating the installation position of the robot unit provided by said input unit, from said predetermined storage region of said first data storage unit and for automatically setting externally input operating conditions in said second data storage unit of said robot control unit.

8. An industrial robot according to claim 7, wherein said data about various installation positions of said robot unit are data of angles of inclination with reference to a reference position consisting of a position where said robot unit is installed on a horizontal ground floor, and wherein said operating conditions are data of an extent of motions and speed of motions of each movable element of said robot unit about each articulatory axis.

9. An industrial robot according to claim 7, wherein said first data storage unit comprises a ROM and said second data storage unit comprises a RAM, respectively.

10. An industrial robot according to claim 7, wherein said input unit comprises an operating panel provided for said robot control unit.

11. An industrial robot according to claim 7, wherein said input unit comprises an operating panel externally connected to said robot control unit.

12. An industrial robot according to claim 7, wherein said movable elements of said robot unit include a plurality of articulated robot arms.

* * * * *